(12) United States Patent
Meyer et al.

(10) Patent No.: US 8,320,280 B2
(45) Date of Patent: Nov. 27, 2012

(54) APPARATUS AND METHOD FOR DETERMINING A COINCIDENCE OF A POSITION WITH A REFERENCE POSITION

(75) Inventors: Steffen Meyer, Erlangen (DE); Juergen Hupp, Nuremberg (DE); Thorsten Vaupel, Homberg (DE); Stephan Haimerl, Seubersdorf (DE); Frank Mueller, Nuremberg (DE); Karin Loidl, Senden (DE); Renata Kitti Zahonyi, London (GB)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 283 days.

(21) Appl. No.: 12/741,395

(22) PCT Filed: Dec. 22, 2008

(86) PCT No.: PCT/EP2008/011037
§ 371 (c)(1),
(2), (4) Date: May 5, 2010

(87) PCT Pub. No.: WO2009/086912
PCT Pub. Date: Jul. 16, 2009

(65) Prior Publication Data
US 2010/0278079 A1 Nov. 4, 2010

(30) Foreign Application Priority Data

Jan. 11, 2008 (DE) .......................... 10 2008 003 980
Aug. 6, 2008 (DE) .......................... 10 2008 036 681

(51) Int. Cl.
*H04L 12/28* (2006.01)
(52) U.S. Cl. ...................................... 370/255
(58) Field of Classification Search ................. 370/255, 370/335, 337, 338, 342, 401
See application file for complete search history.

(56) References Cited

U.S. PATENT DOCUMENTS

| 6,853,847 B2 | 2/2005 | Shioda et al. |
| 2002/0184418 A1 | 12/2002 | Blight |
| 2003/0220116 A1 | 11/2003 | Sagefalk et al. |
| 2007/0184850 A1 | 8/2007 | Hupp et al. |
| 2010/0093368 A1 | 4/2010 | Meyer et al. |

FOREIGN PATENT DOCUMENTS

| DE | 10 2007 028 114 A1 | 9/2008 |
| JP | 2002-291026 A | 10/2002 |

OTHER PUBLICATIONS

Official Communication issued in corresponding German Patent Application No. 10 2008 036 681.1, mailed on Jul. 6, 2011. Official Communication issued in International Patent Application No. PCT/EP2008/011037, mailed on Jun. 12, 2009.
Official Communication issued in corresponding Japanese Patent Application No. 2010-526223, mailed on Mar. 21, 2012.

*Primary Examiner* — Man Phan
*Assistant Examiner* — Nourali Mansoury
(74) *Attorney, Agent, or Firm* — Keating & Bennett, LLP

(57) ABSTRACT

An apparatus for determining a coincidence of a position with a reference position, wherein radio signals from fixedly positioned radio transmitters can be received at the position, having a provider for providing properties of the radio signals of the fixedly positioned radio transmitters at the position, wherein the provided properties of the radio signals include transmitter identifications identifying the radio transmitters, a separator for separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different, and a determiner for determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently.

20 Claims, 5 Drawing Sheets

APPARATUS AND METHOD FOR DETERMINING A COINCIDENCE OF A POSITION WITH A REFERENCE POSITION

BACKGROUND OF THE INVENTION

The present invention relates to apparatuses and methods for determining a coincidence or matching of a position with a reference position, as may for example be used for locating or navigating mobile terminals in a wireless communication network, in particular.

For finding persons with mobile terminals, various localization technologies are available. The probably best-known system for localization and/or navigation in the outdoor area is the satellite-aided global positioning system (GPS). For the localization and/or navigation inside of buildings and/or in an indoor area, various approaches are known, such as infrared systems, RFID (radio frequency identification) systems or also field strength evaluations of IEEE 802.11 WLAN (wireless local area network) networks. At the moment, the GPS system is available in reliable manner only for the outdoor area. More recent extensions, such as highly sensitive receivers or the so-called A-GPS (assisted GPS) represent attempts of making the technology usable also within buildings. Here, A-GPS combines the use of the satellite-based GPS system with reception of so-called assistance information from cellular mobile radio networks. Presently, however, these technologies do not yet have the desired mean accuracies. Infrared systems and RFID systems generally are not available with complete coverage and are bound to specific prerequisites.

Due to the increasing dissemination of wireless radio networks, for example based on the WLAN standard, these wireless networks lend themselves as a basis for new localization methods.

Common, previously used localization methods are based on triangulation, neighborhood relations, lateration by means of time measurement of lateration by means of field strength evaluation, for example. These methods are localization methods in which either a position of stationary transmitters and/or base stations has to be known, or in which training has to take place beforehand at typical positions in an environment to be covered by the localization method.

In WLAN-based localization systems, so-called received signal strength (RSS) fingerprinting often is employed as a basic method. This method is based on the assumption that signal strengths of radio signals of several radio stations received and/or receivable at a current location uniquely characterize the location or position. If there exists a database containing, for a number of reference locations or reference positions, identifications of radio stations received and/or receivable there, as well as the field strengths of corresponding radio signals, the current position may be inferred from a set of current measurement values (transmitter identifications and signal strength values) by performing matching between currently measured measurement values and the reference values of the database. For each reference point, this matching assesses how similar its previously recorded measurement values and/or reference values are to the current measurement values of the current position. The most similar reference point(s) then determine an estimate for the current location.

For a reference database, the signal strength is determined experimentally at a sufficient number of points by test measurements. Thereby, a database containing a list of base stations (access points) with the respectively associated reception field strength and quality for each position at which a test measurement was performed is created. In a WLAN implementation, such a reference database may, for example, include the following parameters:

| RID | MAC | RSSI | PGS | X | Y | Z | MAPNR | CREATED |
|---|---|---|---|---|---|---|---|---|
| 1 | 00.0D.54.9E.17.81 | 46530 | 100 | 5795 | 15627 | 150 | 0 | 12.03.07 12:42 |
| 1 | 00.0D.54.9E.1A.BA | 67260 | 90 | 5795 | 15627 | 150 | 0 | 12.03.07 12:42 |
| 1 | 00.0D.54.9E.1D.64 | 72002 | 88 | 5795 | 15627 | 150 | 0 | 12.03.07 12:42 |
| 1 | 00.0E.6A.D3.B9.8B | 59531 | 100 | 5795 | 15627 | 150 | 0 | 12.03.07 12:42 |
| 1 | 00.0F.A3.10.07.6C | 46464 | 96 | 5795 | 15627 | 150 | 0 | 12.03.07 12:42 |
| 1 | 00.0F.A3.10.07.FB | 74488 | 94 | 5795 | 15627 | 150 | 0 | 12.03.07 12:42 |
| 1 | 00.0F.A3.10.09.5F | 72375 | 97 | 5795 | 15627 | 150 | 0 | 12.03.07 12:42 |
| 2 | 00.0D.54.9E.17.81 | 54138 | 100 | 14399 | 15451 | 150 | 0 | 12.03.07 12:43 |
| 2 | 00.0D.54.9E.18.1D | 76560 | 11 | 14399 | 15451 | 150 | 0 | 12.03.07 12:43 |
| 2 | 00.0D.54.9E.1A.BA | 62318 | 94 | 14399 | 15451 | 150 | 0 | 12.03.07 12:43 |
| 2 | 00.0D.54.9E.1D.64 | 71348 | 96 | 14399 | 15451 | 150 | 0 | 12.03.07 12:43 |
| 2 | 00.0E.6A.D3.B9.8B | 45393 | 100 | 14399 | 15451 | 150 | 0 | 12.03.07 12:43 |
| 2 | 00.0F.A3.10.07.6C | 66853 | 96 | 14399 | 15451 | 150 | 0 | 12.03.07 12:43 |
| 2 | 00.0F.A3.10.07.FB | 72251 | 100 | 14399 | 15451 | 150 | 0 | 12.03.07 12:43 |
| 2 | 00.0F.A3.10.09.5F | 70990 | 90 | 14399 | 15451 | 150 | 0 | 12.03.07 12:43 |
| 3 | 00.0D.54.9E.17.81 | 58291 | 100 | 24583 | 15627 | 150 | 0 | 12.03.07 12:43 |
| 3 | 00.0D.54.9E.18.1D | 78610 | 68 | 24583 | 15627 | 150 | 0 | 12.03.07 12:43 |
| 3 | 00.0D.54.9E.1A.BA | 62153 | 98 | 24583 | 15627 | 150 | 0 | 12.03.07 12:43 |
| 3 | 00.0D.54.9E.1D.64 | 64187 | 90 | 24583 | 15627 | 150 | 0 | 12.03.07 12:43 |
| 3 | 00.0E.6A.D3.B9.8B | 32851 | 100 | 24583 | 15627 | 150 | 0 | 12.03.07 12:43 |
| 3 | 00.0F.A3.10.07.6C | 69006 | 96 | 24583 | 15627 | 150 | 0 | 12.03.07 12:43 |
| 3 | 00.0F.A3.10.07.FB | 71749 | 92 | 24583 | 15627 | 150 | 0 | 12.03.07 12:43 |
| 3 | 00.0F.A3.10.09.5F | 71482 | 83 | 24583 | 15627 | 150 | 0 | 12.03.07 12:43 |
| 3 | 00.0F.A3.10.09.80 | 71000 | 40 | 24583 | 15627 | 150 | 0 | 12.03.07 12:43 |

Thus, the table includes the following information:
- the reference point identification (RID)
- the MAC addresses of the received stations
- the reception field strengths of the access points (RSSI; 46560 means −46.560 dBm)
- the position in Cartesian, metric coordinates (x, y, z; 24583 means 245.83 m), as well as
- the time of measurement value capture.

WLAN signals, which theoretically are to be measured at relatively low field strength only, exhibit a relatively unreliable behavior with respect to "measurable" or "not measurable". The column of PGS ("percentage seen") indicates, in percent, how often this station was seen during measurement value capture (i.e. PGS=90 means that the station was measured in 9 out of 10 measurements, on average). The PGS value is determined when training the reference positions and/or the reference measurement packets for each radio transmitter and is to be understood as a measure for its reliability. Within a certain measurement time window, there is a defined number of possible measurement values from a radio transmitter by way of a fixed sampling interval of e.g. 200 ms. The PGS value is a percentage value of the (RSSI) values of a radio transmitter really measured within the measurement time window in relation to the potentially possible ones. Reference points are captured over a longer time window (e.g. 6 to 10 s) e.g. every 200 ms in the ideal case during calibration. In this respect, FIG. 5 shows an exemplary waveform of a reception signal of a certain radio transmitter, which can be received only relatively unreliably at the measurement position. Over a measurement time window of 10 s, the certain radio transmitter is receivable only for about 3 s, which yields a PGS value of about 30% for this radio transmitter.

For the localization, currently captured measurement values are compared with the database. The most similar one or an integration of the most similar reference values is accepted as current position. Several methods are possible for the matching; the most widely used one is least distance in signal space.

RSS fingerprinting provides good results in the indoor and outdoor areas. Owing to the fact that the setup locations of the stationary radio transmitters do not have to be known, the method also is well-suited for unknown environments with unknown infrastructure. Fingerprinting approaches for the matching assume a fixed, invariable infrastructure. Many known solutions further assume a limited area in which signals of each radio transmitter can be received everywhere.

So as to determine a coincidence or matching of a current position with a reference position, RSSI values of a number of radio transmitters, previously recorded transmitter identifications of which at the reference position are identical with transmitter identifications provided at the position, often are compared with each other in conventional methods. The smaller the deviation of the RSSI values between the radio transmitters with identical transmitter identification, the higher the coincidence of the current position with the reference position. However, this procedure also poses the risk of faulty position estimation—for example when the number of the radio transmitters, previously recorded transmitter identifications of which at the reference position are identical with transmitter identifications provided at the position, is small, and thereby also a small RSSI value deviation is determined, which may lead to a coincidence falsely estimated to be good.

SUMMARY

According to an embodiment, an apparatus for determining a coincidence of a position with a reference position, wherein radio signals from fixedly positioned radio transmitters can be received at the position, may have a provider for providing properties of the radio signals of the fixedly positioned radio transmitters at the position, wherein the provided properties of the radio signals have transmitter identifications identifying the radio transmitters; a separator for separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different; and a determiner for determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently.

According to another embodiment, a navigation device may have an apparatus for determining a coincidence of a position with a reference position to determine a measure of matching of a current position with a reference position, wherein radio signals from fixedly positioned radio transmitters can be received at the position having a provider for providing properties of the radio signals of the fixedly positioned radio transmitters at the position, wherein the provided properties of the radio signals have transmitter identifications identifying the radio transmitters; a separator for separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different; and a determiner for determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently; and an outputter for outputting an estimate for the current position on the basis of the determined measure of matching.

According to another embodiment, a method of determining a coincidence of a position with a reference position, wherein radio signals from fixedly positioned radio transmitters can be received at the position, may have the steps of providing properties of the radio signals of the fixedly positioned radio transmitters at the position, wherein the provided properties of the radio signals have transmitter identifications identifying the radio transmitters; separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different; and determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently.

According to another embodiment, a computer program may have a program code for performing the method of determining a coincidence of a position with a reference position, wherein radio signals from fixedly positioned radio transmitters can be received at the position, which may have the steps of providing properties of the radio signals of the fixedly positioned radio transmitters at the position, wherein the provided properties of the radio signals have transmitter identifications identifying the radio transmitters; separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different; and determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently, when the computer program is executed on a computer.

A further embodiment of the present invention consists in a computer program for performing the method according to the invention.

It is the finding of the present invention that the matching between values and/or properties (e.g. transmitter identifications and signal strength values) of fixedly positioned radio transmitters currently provided and/or measured at a current (geographical) position and previously recorded reference values and/or properties at a (geographical) reference position considered can be achieved by a type of filtering of the currently measured properties of the radio signals at the position and the reference values of the previously recorded radio signals at the reference position. Here, the radio signals are subdivided into a first number of radio transmitters previously recorded transmitter identifications of which at the reference position are identical with transmitter identifications provided at the current position, and into a second number of radio transmitters previously recorded transmitter identifications of which at the reference position and transmitter identifications provided at the position are different, i.e. the transmitter identifications of which either are provided only at the current position and have not been recorded previously at the reference position, or the transmitter identifications of which have been recorded previously only at the reference position and are not provided at the current position.

A set of measurement values measured at the current position, including radio-transmitter-identifying transmitter identifications (e.g. MAC addresses) and accompanying signal strength values (RSSI=received signal strength indicator), shall be referred to as measurement packet (MP) in the following. According to embodiments of the present invention, supplied measurement values at the current position and previously recorded measurement values at the reference position are pre-filtered in three groups. On the one hand, all radio transmitters from a measurement packet also included in the reference measurement packet underlying the matching are separated. Radio transmitters received at the current position and deviating from the reference measurement packet (heard too much) imply that one cannot be at the reference position. These radio transmitters received in addition at the current position cannot be used in a direct matching, i.e. in a matching between radio transmitters with the same transmitter identifications in the current measurement packet and in the reference measurement packet. Moreover, radio transmitters not having been received (not heard) at the current position may be listed in the reference data of the reference position or the reference measurement packet. These radio transmitters and/or their measurement values not received at the current position also need special treatment and therefore are not supplied to the direct matching, i.e. the matching between radio transmitters with the same transmitter identifications in the current measurement packet and in the reference measurement packet.

A matching unit matches the current measurement values at the current position with every reference point of the reference data in question, i.e. a measure of matching between the current position and every reference point in question is determined. An amount of the reference points and/or positions that are matched may optionally also be restricted, for example by taking a last position of the mobile terminal as starting point, assuming that the user has not moved from the last position more than a fixed maximum distance since then. Restriction of the reference points to be compared may take place dynamically due to a movement model, quality of the current position determination, limited computation power or limited storage, etc.

In each comparison of a current measurement packet with a reference measurement packet, one determines a measure of matching, which defines how well the received measurement values at the current position and the previously recorded measurement values of the reference position match. The determination of the measure of matching for the position takes place on the basis of the supplied properties of the radio signals, wherein both properties of the first number of radio transmitters and properties of the second number of radio transmitters are taken into account in the determination of the measure of matching, and wherein the properties of the first number of radio transmitters and the properties of the second number of radio transmitters enter the measure of matching differently. In the first number of radio transmitters, previously recorded transmitter identifications at the reference position are identical with transmitter identifications provided at the current position. In the second number of radio transmitters, transmitter identifications are provided either only at the current position and have not been recorded previously at the reference position, or transmitter identifications have been recorded previously only the at the reference position and are not provided at the current position.

According to an embodiment, the properties of the first number of radio transmitters are weighted more strongly than the properties of the radio signals of the second number of radio transmitters. This means that the number of radio transmitters previously recorded transmitter identifications of which at the reference position are identical with the transmitter identifications provided at the position is considered more strongly in the calculation of the measure of matching than the second number of radio transmitters previously recorded transmitter identifications of which at the reference position and transmitter identifications provided at the position are different, i.e. of radio transmitters the transmitter identifications of which either are provided only at the position and have not been recorded previously at the reference position, or the transmitter identifications of which have been recorded previously only at the reference position and are not provided at the position. The weights of the properties of the first and second numbers, for example, complement one other complementarily to one.

Further embodiments and further implementations are the subject matters of the dependent claims.

By including the measurement values of the radio transmitters the transmitter identifications of which are received only at the current position and have not been recorded previously at the reference position, and including the radio transmitters the transmitter identifications of which have been recorded previously only at the reference position and are not received at the current position, accuracy in the determination of the measure of matching between the current position and the reference position can be increased significantly. This may lead to noticeable improvements of the localization and/or navigation results.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention will be explained in greater detail in the following with reference to the accompanying drawings, in which.

DETAILED DESCRIPTION OF THE INVENTION

Figure 1:
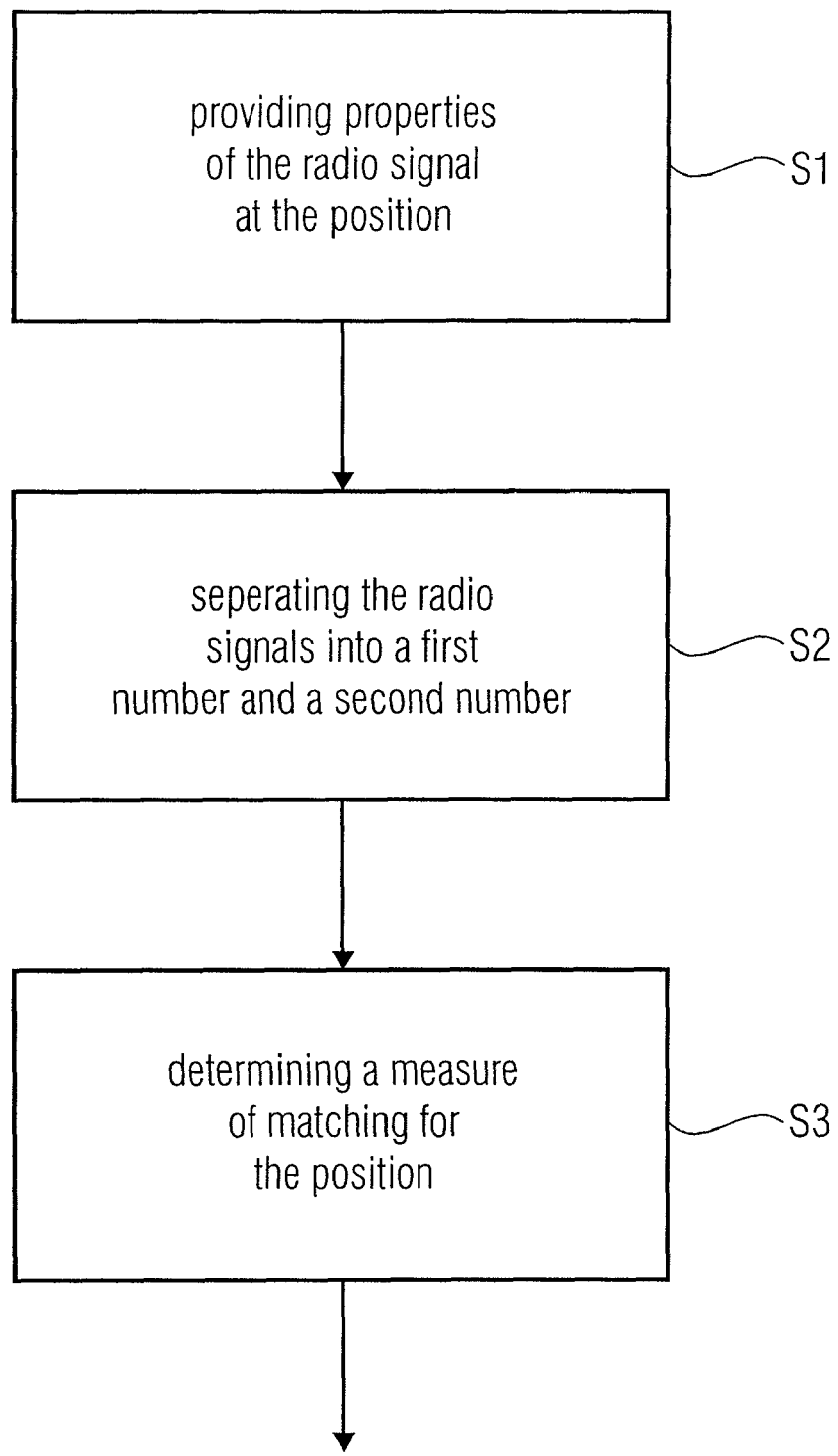
FIG. 1 is a flowchart for illustrating a method of determining a coincidence between a current position and a reference position, according to an embodiment of the present invention.

Regarding the subsequent description, it is to be noted that the same or like functional elements comprise the same reference numerals in the different embodiments, and hence the descriptions of these functional elements are mutually interchangeable in the various embodiments illustrated in the following.

Subsequently, on the basis of FIGS. 1 to 4, the inventive concept for determining a coincidence or matching of a current geographical position with a geographical reference position will be described.

So as to obtain reference positions, a user for example records radio fingerprints in a training phase, in order to use these in a later localization phase as part of a database. In practice, the training may for example take place with a PDA or smart-phone. A geographical map of the target surroundings may for example be filed as a bitmap. When training, the user marks the current position thereof on the map and then triggers the measurement value capture. In practice, it has turned out that denser training points hardly improve the result significantly, but clearly increase the computational effort when localizing.

Manually collecting fingerprints, however, is only feasible in limited areas. In city or town centers, so-called calibration boxes may be employed for this purpose. These have a highly precise GPS unit (so-called differential GPS) in combination with highly accurate inertial sensors (for example acceleration sensors and electronic compasses) each. These calibration boxes may collect fingerprints without manual intervention, when moving same through the city or town. The localization via differential GPS allows for position determination with a mean accuracy of few decimeters also in the urban environment, which continues for up to 20 minutes even upon failure of the GPS system, due to the highly precise inertial sensor technology. Roofed-over passages thus do not present any problems for the calibration box, for example.

FIG. 1 first shows a flowchart for illustrating a method of determining the coincidence of the current position, at which a mobile terminal is, with the reference position.

The method of determining the coincidence schematically illustrated in FIG. 1 comprises a first step S1 of determining and/or providing properties of radio signals of fixedly positioned radio transmitters at the current position, wherein the determined and/or provided properties of the radio signal include transmitter identifications identifying the radio transmitters. This means that, among other things, transmitter identifications of the radio transmitters are determined in the step S1. In addition, in embodiments of the present invention, electromagnetic properties of the radio signals, such as reception field strength, reception power spectrum, signal-to-noise power ratio (SNR=signal-to-noise ratio), angle of incidence, propagation time, polarization or phase location of the radio signals, are determined.

In a second step S2, the radio signal and/or the radio transmitters associated with the radio signals are separated and/or filtered into a first number $N_{eq}$ of radio transmitters previously recorded transmitter identifications of which at the reference position are identical with transmitter identifications provided at the current position, and into a second number $N_{neq}$ of radio transmitters previously recorded transmitter identifications of which at the reference position and transmitter identifications provided at the position are different, i.e. of radio transmitters the transmitter identifications of which either are provided only at the current position and have not been recorded previously at the reference position, or the transmitter identifications of which have been recorded previously only at the reference position and are not provided at the current position. According to embodiments, the second step S2 additionally includes a sub-step to select, from the second number $N_{neq}$ of radio transmitters, a number $N_{nh}$ of radio transmitters not received at the current position, i.e. radio transmitters of which there exist previously recorded properties at the reference position, but of which there do not exist properties provided at the current position. The greater the number $N_{nh}$ of the radio transmitters not received at the current position, the more likely it is that the current position does not correspond to the reference position. Furthermore, step S2 includes a further sub-step, in which a number $N_{htm}$ of radio transmitters received in addition at the current position, and of which there are no previously determined electromagnetic properties at the reference position, but of which there are electromagnetic properties provided at the current position is selected from the second number $N_{neq}$. The greater the number $N_{htm}$ of the radio transmitters received in addition at the current position, the more likely it is that the current position does not correspond to the reference position. The second number $N_{neq}$ of radio transmitters thus results from the number $N_{nh}$ of radio transmitters not received at the current position and the number $N_{htm}$ of radio transmitters received in addition at the current position, according to $N_{neq}=(N_{nh}+N_{htm})$.

Based on the properties of the radio signals provided from step S1, a measure of matching and/or a distance value acc for the current position is determined in a third step S3, wherein both properties of the first number $N_{eq}$ of radio transmitters and properties of the second number $N_{neq}$ of radio transmitters are taken into account in the determination in the measure of matching, and wherein the properties of the first number $N_{eq}$ of radio transmitters and the properties of the second number $N_{neq}$ of radio transmitters enter the measure of matching differently. According to embodiments, the properties of the first number $N_{eq}$ of radio transmitters are weighted more strongly than the properties of the second number $N_{neq}$ of radio transmitters, which will be dealt with in detail in the following.

Step S1 of determining and/or providing the properties of radio signal is performed by a mobile terminal and/or a client, such as a WLAN-enabled PDA, a Bluetooth-enabled PDA or also a mobile telephone, for example, according to embodiments of the present invention. To this end, the client comprises means for determining and/or providing the properties of the radio signals of the fixedly positioned radio transmitters, wherein the properties generally are characterized by an identification of a fixedly positioned radio transmitter and its electromagnetic signal characteristic, such as reception field strength, reception spectrum or received signal-noise ratio. The identification and/or an identifying feature of a fixedly positioned radio transmitter may for example be its MAC (media access control) address, base station identification, or a cell identification.

The properties of the radio signals of the fixedly positioned radio transmitters are combined to so-called measurement packets MP(i). This fact is shown exemplarily in FIG. 2.

Figure 2:
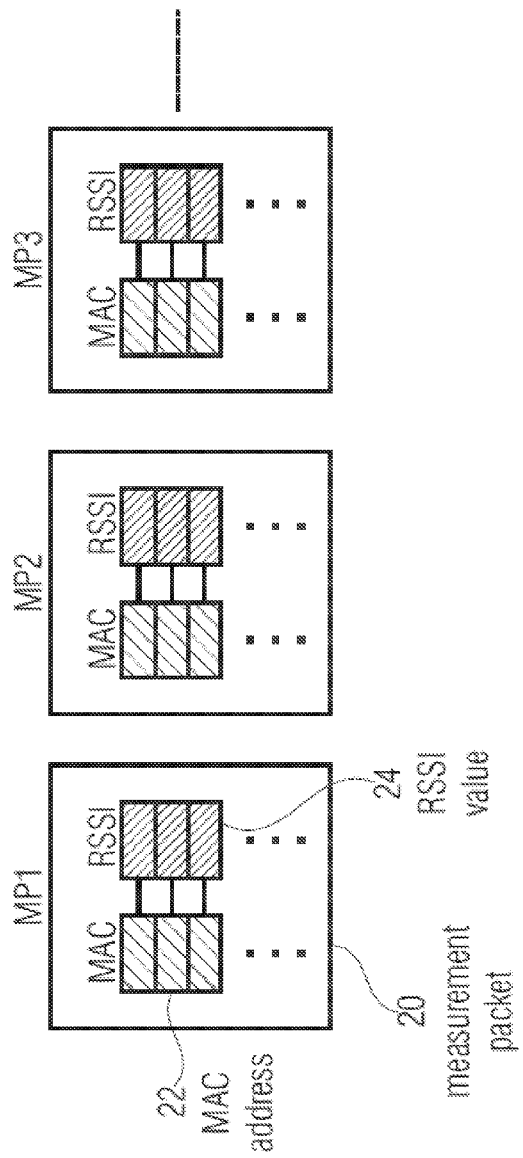
FIG. 2 shows an exemplary series of measurement packets.

FIG. 2 exemplarily shows three temporally successive measurement packets 20 from a WLAN network MP(1), MP(2), MP(3), i.e. i=1, 2, 3, wherein a measurement packet MP(i) comprises a plurality of MAC addresses 22 and associated RSSI values $RSSI_k(i)$ each, wherein the index k indicates a k-th radio transmitter. This means that the MAC addresses of the fixedly positioned radio transmitters as well as their RSSI values 24 received by the client are combined in a measurement packet MP(i) per time interval.

Figure 3:
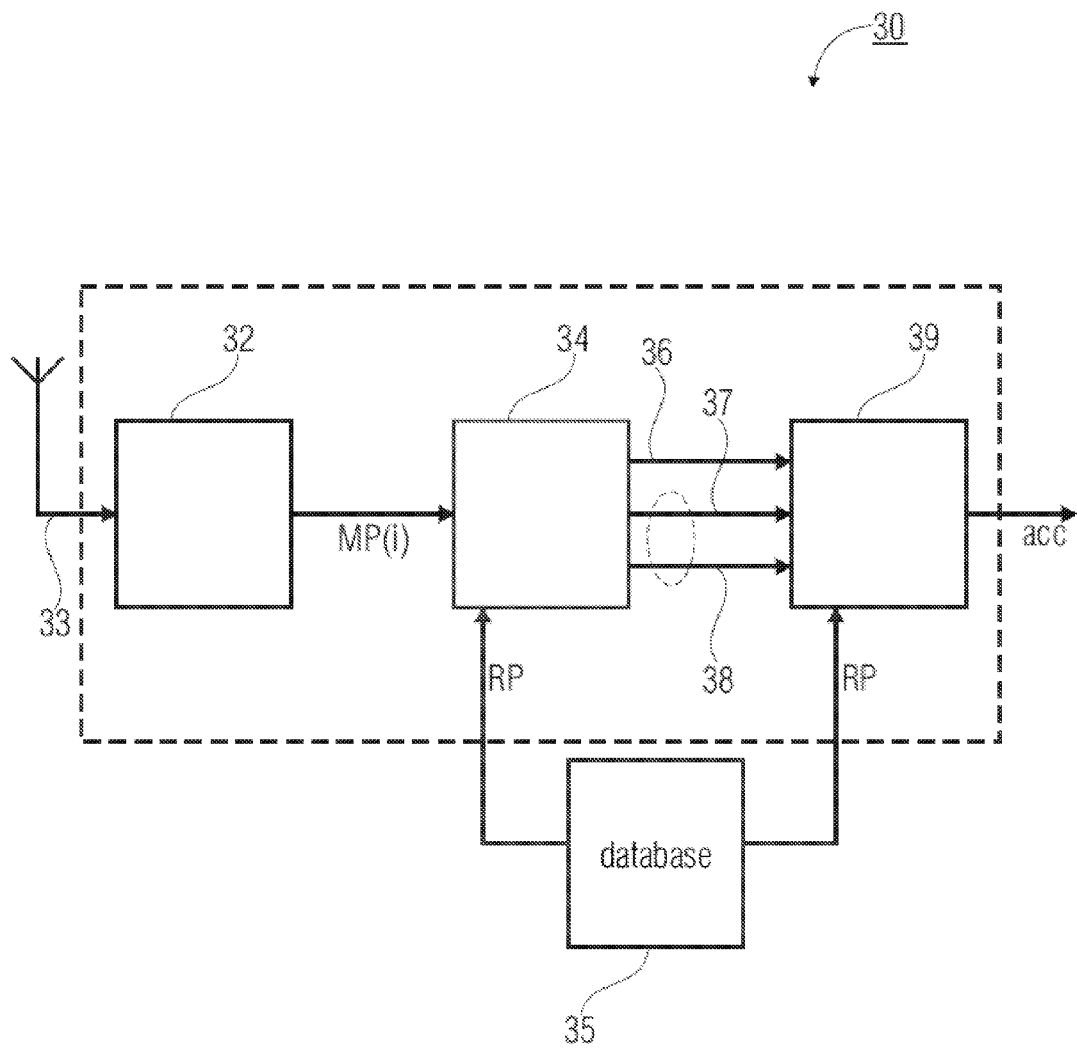
FIG. 3 is a schematic illustration of an apparatus for determining a coincidence of a current position with a reference position, according to an embodiment of the present invention.

FIG. 3 shows an apparatus 30 for determining a coincidence of a current position with a reference position, according to an embodiment of the present invention. Here, radio signals of fixedly positioned radio transmitters and/or base stations can be received at the current position.

To this end, the apparatus 30 comprises means 32 for providing properties of the radio signals of the fixedly positioned radio transmitters at the current position, wherein the provided properties of the radio signals include transmitter identifications, such as MAC addresses, identifying the radio transmitters. To this end, the means 32 may be coupled to a reception antenna 33 to receive the properties of the radio signals, such as also electromagnetic properties. In particular, the previously described measurement packet MP(i) may be meant by the properties of the radio signals. The determined and/or provided properties MP(i) are provided to means 34 for separating the radio signals and/or their associated radio transmitters into a first number $N_{eq}$ of radio transmitters and a second number $N_{neq}$ of radio transmitters. Here, the first number $N_{eq}$ of radio transmitters includes those radio transmitters previously recorded transmitter identifications of which at the considered reference position are identical with transmitter identifications determined at the present position. The second number $N_{neq}=(N_{nh}+N_{htm})$ of radio transmitters includes those radio transmitters the transmitter identifications of which either are provided only at the position and have not been recorded previously at the reference position, or the transmitter identifications of which have been recorded previously only at the reference position and are not provided at the position. So as to determine the first number $N_{eq}$ and the second number $N_{neq}$ of radio transmitters, the means 34 for separating may be coupled to a database 35, in which previously recorded properties of radio signals from a plurality of reference positions, i.e. reference measurement packets, are stored. This means that the database 35 includes, for example, a multiplicity of previously recorded measurement packets, each associated with a reference position. These previously recorded measurement packets subsequently are to be referred as reference measurement packets RP. The means 34 thus separates the radio signals into at least two groups. A first group 36 includes properties of radio signals of the first number $N_{eq}$ of radio transmitters, whereas a second group 37, 38 includes properties of radio signals of the second number $N_{neq}$ of radio transmitters. As already described before, the second group 37, 38 may be subdivided further into a group of properties of radio signals of radio transmitters not received at the current position and into a group of properties 38 of radio signals from radio transmitters received in addition at the position.

The apparatus 30 further includes means 39 for determining a measure of matching for the current position, which may be coupled both to the means 34 for separating and to the database 35. The means 39 is formed to determine the measure of matching on the basis of the supplied properties 36, 37, 38 of the radio signals, wherein both properties 36 of the first number $N_{eq}$ of radio transmitters and properties 37, 38 of the second number $N_{neq}$ of radio transmitters are taken into account in the determination of the measure of matching and/or the distance value acc, and wherein the properties 36 of the first number $N_{eq}$ of radio transmitters and the properties 37, 38 of the second number $N_{neq}$ of radio transmitters enter the measure of matching differently, i.e. are weighted differently.

The means 32 provides, at every location and/or every position, signals of several base stations and/or radio transmitters at different signal strengths, together with the accompanying transmitter identifications. In the case of WLAN networks, such an electronic fingerprint includes a list of MAC addresses unique for each WLAN device and/or WLAN radio transmitter and the reception signal strengths accompanying the same, and hence characterizes the current position. It is irrelevant where the WLAN radio transmitters are.

Localization substantially consists of two steps: Firstly, a matching of the currently measured measurement packets with the fingerprints and/or the reference measurement packets in the database 35, and secondly, selection of appropriate position candidates on the one hand, as well as the weighting and combination of the candidate positions to a position estimation on the other hand.

In a matching phase, deviations of a currently measured measurement packet MP(i) from reference measurement packets RP in the database 35 are determined. In particular, means 34 and 39 of the apparatus 30 according to the invention serve this purpose.

Figure 4:
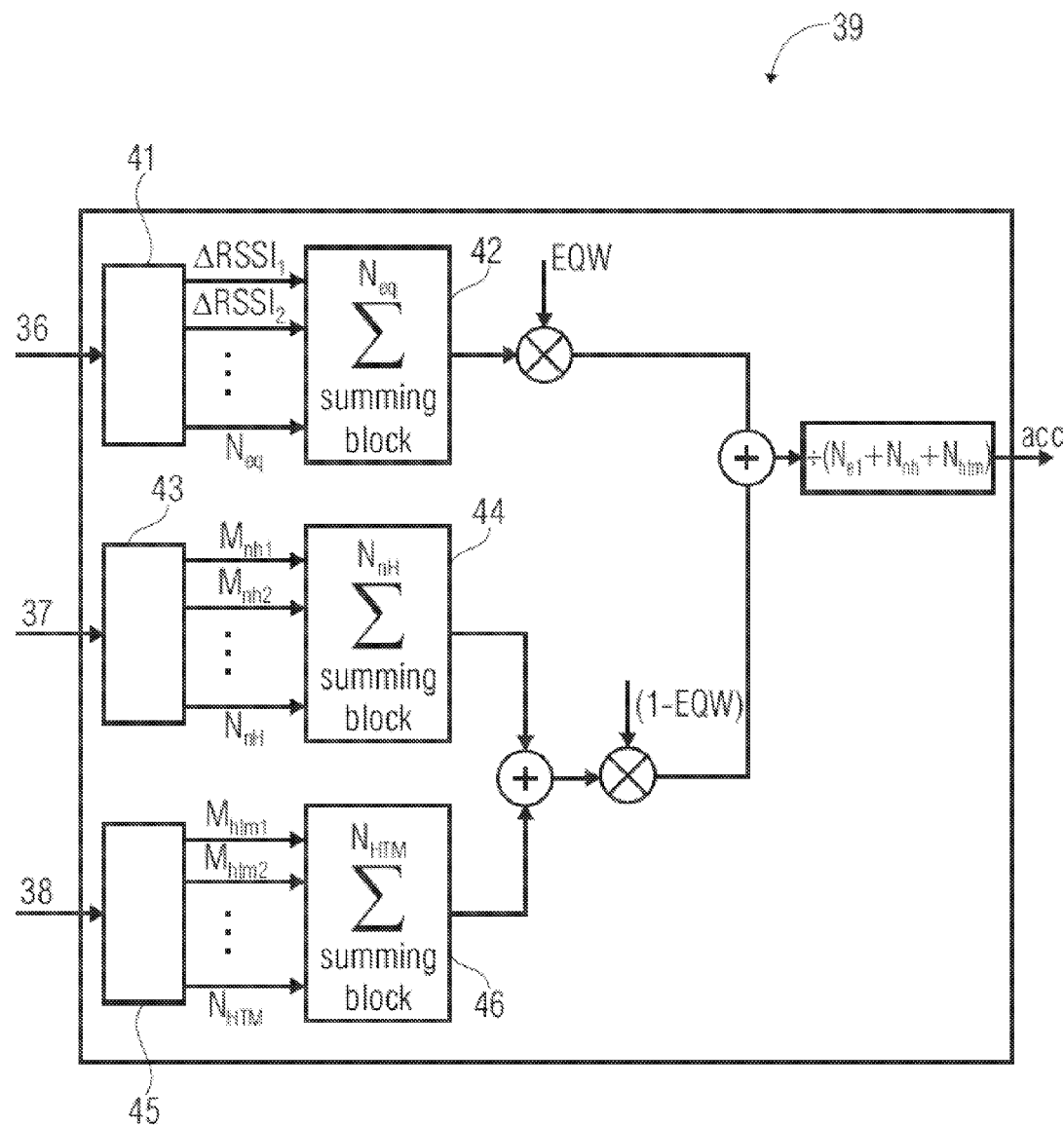
FIG. 4 is a block diagram of a means for determining a measure of matching for the position, according to an embodiment of the present invention.
Figure 5:
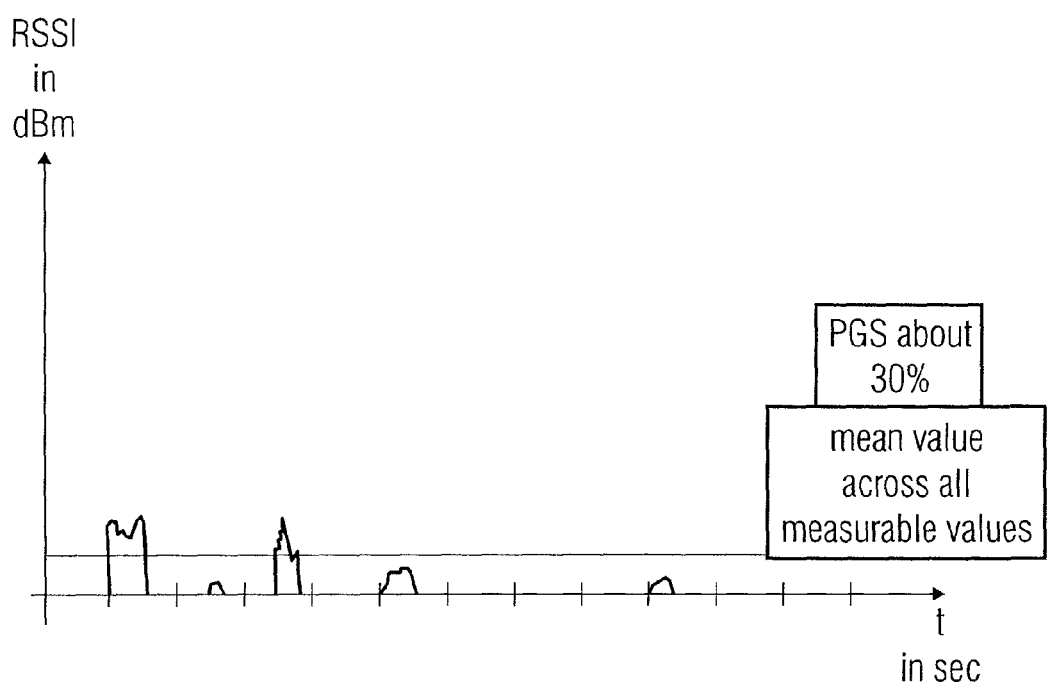
FIG. 5 shows a typical waveform of a radio transmitter that can be received unreliably.

So as to find possible candidate positions for the current position from the multiplicity of stored reference positions in the matching phase, the means 39 determines the measure of matching between currently measured measurement packets and reference measurement packets previously recorded at reference positions. A schematic block circuit diagram of means 39 for determining the measure of matching and/or the distance value acc is shown in FIG. 4.

As already described before, means 39 is supplied with electromagnetic properties 36, e.g. RSSI values, of the first number $N_{eq}$ of radio transmitters on the input side. Furthermore, electromagnetic properties 37, 38, such as RSSI values, of the second number $N_{neq}$ of radio transmitters are present at the input of means 39. Here, the properties 36 of the first number $N_{eq}$ of radio transmitters include both the signal properties measured at the current position and the signal properties previously recorded at the reference position.

According to embodiments, in a block 41, differences between the previously recorded electromagnetic properties at the reference position and the electromagnetic properties provided at the current position of the first number $N_{eq}$ of radio transmitters are formed. For example, differences are formed of RSSI values of radio transmitters previously recorded transmitter identifications of which at the reference position are identical with transmitter identifications supplied at the current position. These difference RSSI values $\Delta RSSI_1$ to $\Delta RSSI_{Neq}$ are provided to a summing block 42, which sums up the $N_{eq}$ difference RSSI values $\Delta RSSI_n$ (n=1, to a sum $\Sigma \Delta RSSI_n$. $N_{eq}$ is the first number of radio transmitters present both in the measurement packet and the reference packet. The function $\Delta RSSI$ calculates a distance between two signal strength values. The Euclidean distance of the measurement values in dB may for example be chosen as distance function. In this connection, distance thus does not mean spatial distance, but mathematical deviation. Following the summing by the block 42, the sum $\Sigma \Delta RSSI_n$ is weighted with a weighting factor EQW, i.e. $EQW \cdot \Sigma \Delta RSSI_n$. Here, EQW defines a weight between 0 and 1, which indicates how strongly the distance of the measurement values and/or the distance of the signal strength values $\Sigma \Delta RSSI_n$ is to be valued in comparison with the radio transmitters at the current position with respect to the ones heard too much or too little.

If the calculation of the measure of matching was stopped at this point, it would be possible that reference positions actually being a worse match with respect to the current position are selected as candidates than better fitting ones. One example of this: Let us assume that $N_{eq}$=1 is obtained for a first reference point as compared with the current position, i.e. only one radio transmitter identification matches between reference measurement packet and current measurement packet. If the corresponding RSSI values of the matching measurement packets by chance are 2.5 dB apart, for example, one obtains $\Sigma \Delta RSSI_1/N_{eq}$=2.5 dB. Let us further assume that $N_{eq}$=3 results for a second reference point in comparison with the current position, i.e. three radio transmitter identifications match between the reference measurement packet and the current measurement packet. If the corresponding RSSI values are 2 dB, 3 dB and 4 dB apart, for example, one obtains $\Sigma \Delta RSSI_n/N_{eq}$=3 dB altogether. As a result, the second reference point would be assessed to be worse than the first one, which would lead to an estimation error. Embodiments of the present invention may avoid and/or at least reduce such estimation errors.

Reference numeral 37 characterizes properties of radio signals from a number $N_{nh}$ of radio transmitters not received at the current position, i.e. of radio transmitters of which there are previously recorded properties at the reference position, but of which there is no property provided at the position, i.e. from radio transmitters which cannot be received at the current position. In a block 43, a malus function and/or a malus value $M_{nh,m}()$ (m=1, ..., $N_{nh}$) can be defined for each of the radio transmitters not received. This means that a malus value $M_{nh,m}()$ (m=1, ..., $N_{nh}$) can be defined for each station present in the reference values, but not in the current measurement values. This may for example depend on how reliably the corresponding station not received could be received at the reference position in the past. In case of previously good reception capability of the station not received, i.e. high RSSI value, a high malus value results, for example. The malus value $M_{nh,m}()$ (m=1, ..., $N_{nh}$) may thus be directly proportional to the reference RSSI value of the station not received at the current position, according to embodiments. Moreover, the malus function $M_{nh,m}()$ (m=1, ..., $N_{nh}$) may be linked to a PGS value of the corresponding radio transmitter not received. A small PGS value in the reference database may for example also lead to only a small value of the corresponding malus $M_{nh,m}()$. This may for example be calculated by way of the following formula: $M_{nh,m}(PGS)$=FixMalus+DynamicMalus, wherein DynamicMalus=FixMalus*PGS/100. The function $M_{nh,m}()$ (m=1, ..., $N_{nh}$) for a malus value for a radio transmitter not received thus is dependent on a property related to a reception field strength and recorded previously at the reference point, as well as on models, for example for the environment, the quality of the measurement values, etc., according to embodiments. The $N_{nh}$ malus values $M_{nh,m}()$ (m=1, ..., $N_{nh}$) for the radio transmitters not received at the current position are handed over to a summing block 44 to determine a first sum $\Sigma M_{nh,m}()$ of the $N_{nh}$ malus values of the radio transmitters not received.

Properties of radio signals from a number $N_{hrm}$ of radio transmitters received in addition at the current position are provided with the reference numeral 38. What is meant thereby is radio transmitters of which there are no previously recorded electromagnetic properties at the reference position, but of which there are electromagnetic properties provided at the current position. In a block 45, a malus function $M_{htm,r}()$ (r=1, ..., $N_{htm}$) and/or a malus value may be associated with each radio transmitter received in addition at the current position. This means that, for each radio transmitter missing in the reference values but included in the currently measured measurement values, there may be defined a malus value $M_{htm,r}()$ (r=1, ..., $N_{htm}$). Here, the function for the malus value $M_{htm,r}()$ (r=1, ..., $N_{htm}$) may also be dependent on the current RSSI measurement value of the radio transmitter, as well as on models, for example for the environment, the quality of the measurement values, the age of the reference data, etc. According to an embodiment of the present invention, this means that the means 39 for determining is formed to associate a malus value $M_{htm,r}()$ (r=1, ..., $N_{htm}$) with a radio transmitter received in addition at the current position, depending on a property related to the reception field strength of its radio signal, for example the RSSI value. The malus value $M_{htm,r}()$ (r=1, ..., $N_{htm}$) thus is directly proportional to the reference RSSI value of the station received in addition at the current position, according to embodiments. Moreover, the malus function $M_{htm,r}()$ (r=1, ..., $N_{htm}$) may be linked to a PGS value of the corresponding radio transmitter received in addition. A smaller PGS value in the reference database may, for example, also lead only to a smaller value of the corresponding malus function $M_{htm,r}()$ (r=1, ..., $N_{htm}$).

The $N_{htm}$ malus values of the radio transmitters received in addition are handed over to a summing block 46 to sum up the $N_{htm}$ malus values to a second sum $\Sigma M_{htm,r}()$.

The first sum $\Sigma M_{nh,m}()$ of the malus values of the radio transmitters not received and the second sum $\Sigma M_{htm,r}()$ of the radio transmitters received in addition are summed up and weighted with a weighting factor (1−EQW), i.e. $(1-EQW) \cdot (\Sigma M_{nh,m}()+\Sigma M_{htm,r}())$, according to embodiments.

Finally, according to an embodiment, the weighted sum $EQW \cdot \Sigma \Delta RSSI_n$ of the differences between the previously recorded electromagnetic properties at the reference position and the electromagnetic properties provided at the position of the first number $N_{eq}$ of radio transmitters and the weighted sum $(1-EQW) \cdot (\Sigma M_{nh,m}()+\Sigma M_{htm,r}())$ of the malus values and normalized with $(N_{eq}+N_{nh} N_{htm})$ to obtain the distance value acc between the current position and the reference position considered. The distance value acc thus may for example be calculated according to $$acc = \frac{EQW \cdot \sum_{n=1}^{N_{eq}} \Delta RSSI_n() + (1-EQW) \cdot \left(\sum_{m=1}^{N_{nh}} M_{nh,m}() + \sum_{r=1}^{N_{HTM}} M_{htm,r}()\right)}{N_{eq} + N_{nh} + N_{htm}}. \quad (1)$$

If the distance value acc is determined according to eq. (1), a coincidence between the current position and the reference position considered is the greater, the smaller the distance value acc is. This means that the coincidence is the greater, the smaller the sum $\Sigma \Delta RSSI_n$ of the differences is and the smaller the sums $\Sigma M_{nh,m}$ ( ), $\Sigma M_{htm,r}$( ) of the malus values are. According to an embodiment, the distance value acc corresponds to the measure of matching.

According to other embodiments, the measure of matching could also be inverse to the distance value acc, or it could be calculated according to (1−acc) if acc cannot become greater than 1. That means the smaller the distance acc, the greater the measure of matching. Of course, other calculation rules are possible as well, wherein the properties of the first number $N_{eq}$ of radio transmitters and the properties of the second number $N_{neq}=(N_{nh}+N_{htm})$ of radio transmitters enter the measure of matching differently.

In embodiments of the present invention, each station received in addition or not received thus increases the distance acc. The treatment of different stations in the fingerprint and in current measurement values strongly influences the accuracy: a station missing in the stored reference fingerprint but showing up in the current measurement provides strong indication for the fact that this fingerprint does not fit.

In large areas, the distance calculation to all stored reference fingerprints according to equation (1) may take a lot of time. Preselection of reference fingerprints therefore is advantageous. The last calculated position of the terminal may already provide an indication of the current position. Digital maps of surroundings may further limit the number of candidates. Such an area limitation also poses risks, however. If the estimated position is far off the mark, the positioning cannot recover anymore and remains stuck at the "best wrong" position. Hence, it is a matter of checking the absolute quality of the candidate positions as well. If the absolute quality of the best candidate is too bad, e.g. due to very weak RSSI values, the matching should be restarted without area limitation. At the end of the matching phase, one obtains a number of probable locations and/or candidate positions from which an estimate for the current position may then be determined.

The best position candidate(s) determined in the matching phase are employed for a so-called position calculation phase in a navigation device including an apparatus 30 according to the invention. To this end, a navigation device according to the invention additionally includes means for outputting an estimate for the current position on the basis of the measure of matching and/or the distance acc communicated by the apparatus 30.

The means for outputting the estimate for the position calculates the position and/or the estimate for the position of the mobile terminal from candidate positions not above or below a default limit for the measure of matching and/or the distance acc. Here, individual positions are considered less, but rather placed in a context of an overall motion. The result represents the estimate for the current position of the terminal.

A simple realization consists in a computation of a weighted mean value of the candidate positions, for example. Values dependent on the measures of matching of the candidate positions, e.g. inverse measures of matching, here form the weights of the candidate position in the averaging. This so-called k-weighted nearest neighbor method indeed provides reasonable results. The mean positioning errors are at a few meters.

However, the estimate for the current position may also be determined by means of more complex methods, for example by means of methods from the probability calculus, such as by means of the Bayesian method or Markov chains. Here, it is a basic idea to compensate for errors in individual position estimations by afterwards considering and optimizing an entire path. The calculation of the most probable path may further include additional data, such as maps of surroundings. Motion estimation filters, such as a Kalman filter, may also be employed. Such a filter estimates the direction of movement, speed and acceleration on the basis of the last positions and establishes a prognosis for the future. Matching between prognosis and calculated position may recognize and correct implausible movements and jumps.

In the matching and position calculation phases, digital maps of surroundings may provide important additional information. A digital map of the surroundings from which possible paths can be seen may help recognizing impossible movements and correcting same to allowable paths. The accuracy of the localization may increase significantly thereby. Digital maps may either consist of possible paths (positive map), include only inaccessible areas (negative maps), or represent the constructive conditions, such as floors, walls or doors (real maps). In the field of vehicle navigation, it is customary to employ positive maps. These include roads and paths as well as important meta data (for example the driving direction in one-way streets as well as speed limits). Positive maps make sense here, since the accessible roads and paths only occupy a fraction of a country's area.

In buildings, halls, or on works premises, paths are only limited by few obstacles, however. Here, negative or real maps are the obvious thing. While positive maps for vehicle navigation are commercially available in several standard formats (such as GDF, SIF or ArcView), no standard has developed as of now for maps in and around buildings. Previous WLAN localization solutions leave it to the user to establish a map of surroundings in the appropriate format and offer support with proprietary tools. Basic information may often be taken over from bitmaps or CAD plans. The development of town- or city- and nation-wide, navigation-suited 3D maps, which also include building details in addition to streets and public buildings, hence is an important step toward standardization of the map formats.

In summary, it is pointed out that, depending on the conditions, the inventive concept may also be implemented in software. The implementation may be on a digital storage medium, in particular a floppy disc, a CD or a DVD, with electronically readable control signals capable of cooperating with a programmable computer system and/or microcontroller so that the corresponding method is executed. In general, the invention thus also consists in a computer program product with program code stored on a machine-readable carrier for performing the inventive method, when the computer program product is executed on a computer and/or microcontroller. In other words, the invention may thus be realized as a computer program with program code for performing the method, when the computer program is executed on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining a coincidence of a position with a reference position, wherein radio signals from fixedly positioned radio transmitters can be received at the position, comprising:
   a provider for providing properties of the radio signals of the fixedly positioned radio transmitters at the position, wherein the provided properties of the radio signals comprise transmitter identifications identifying the radio transmitters;
   a separator for separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different, wherein the separator for separating is formed to select, from the second number of radio transmitters, a number of radio transmitters received too few at the position, of which there are previously recorded properties at the reference position, but of which there are no properties provided at the position, or a number of radio transmitters received in addition at the position, of which there are no previously recorded electromagnetic properties at the reference position, but of which there are electromagnetic properties provided at the position; and
   a determiner for determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently, wherein the determiner for determining is formed to associate a malus value with one of the radio transmitters not received at the position or a malus value with a radio transmitter received in addition at the position.

2. The apparatus according to claim 1, wherein the second number of radio transmitters comprises transmitter identifications either provided only at the position and not having been recorded previously at the reference position; or having been recorded previously only at the reference position and not provided at the position.

3. The apparatus according to claim 1, wherein the properties of the first number of radio transmitters are weighted more strongly than the properties of the second number of radio transmitters.

4. The apparatus according to claim 1, wherein the properties of the radio signals comprise electromagnetic properties of the radio signals.

5. The apparatus according to claim 4, wherein the determiner for determining is formed to determine the measure of matching for the position on the basis of differences between previously recorded electromagnetic properties at the reference position and the electromagnetic properties provided at the position of the first number of radio transmitters.

6. The apparatus according to claim 5, wherein the determiner for determining is formed to associate a higher measure of matching with the position, the smaller the sum of the differences is.

7. The apparatus according to claim 1, wherein the provider for providing the properties of the radio signals is formed to provide reception-field-strength-related properties of the radio signals at the position.

8. The apparatus according to claim 7, wherein the provider for providing the properties of the radio signals is formed to provide an RSSI (Received Signal Strength Indicator) value, a reception power spectrum, or a signal-to-noise power ratio of the radio signals at the position.

9. The apparatus according to claim 1, wherein the determiner for determining is formed to associate the malus value with a radio transmitter received too few at the position, depending on how reliably the radio transmitter could be received at the reference position in the past.

10. The apparatus according to claim 1, wherein the determiner for determining is formed to associate the malus value with a radio transmitter not received at the position, depending on a property related to a reception field strength.

11. The apparatus according to claim 1, wherein the determiner for determining is formed to associate a higher measure of matching with the position, the smaller the sum of the malus values of the radio transmitters not received at the position is.

12. The apparatus according to claim 1, wherein the determiner for determining is formed to associate the malus value with a radio transmitter received in addition at the position, depending on a property related to the reception field strength of its radio signal.

13. The apparatus according to claim 1, wherein the determiner for determining is formed to associate a higher measure of matching with the position, the smaller a sum of respective malus values of the radio transmitters received in addition at the position is.

14. The apparatus according to claim 1, wherein the determiner for determining properties of the radio signals is formed to determine properties of WLAN (wireless local area network) radio signals.

15. A navigation device, comprising
   an apparatus for determining a coincidence of a position with a reference position to determine a measure of matching of a current position with a reference position, wherein radio signals from fixedly positioned radio transmitters can be received at the position, comprising:
   a provider for providing properties of the radio signals of the fixedly positioned radio transmitters at the position, wherein the provided properties of the radio signals comprise transmitter identifications identifying the radio transmitters;
   a separator for separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different, wherein the separator for separating is formed to select, from the second number of radio transmitters, a number of radio transmitters received too few at the position, of which there are previously recorded properties at the reference position, but of which there are no properties provided at the position, or a number of radio transmitters received in addition at the position, of which there are no previously recorded electromagnetic properties at the reference position, but of which there are electromagnetic properties provided at the position; and a determiner for determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently, wherein the determiner for determining is formed to associate a malus value with one of the radio transmitters not received at the position or a malus value with a radio transmitter received in addition at the position; and an outputter for outputting an estimate for the current position on the basis of the determined measure of matching.

16. The navigation device according to claim 15, wherein the apparatus for determining the measure of matching is formed to form a measure of matching each between the current position and a limited number of reference positions, wherein the limited number of reference positions lies in a predetermined neighborhood of an estimate for a previous position to the current position.

17. The navigation device according to claim 15, wherein the outputter for outputting the estimate is formed to determine and output the estimate on the basis of a mean value of a plurality of reference positions with measures of matching above or below a limit.

18. A method of determining a coincidence of a position with a reference position, wherein radio signals from fixedly positioned radio transmitters can be received at the position, comprising:

providing properties of the radio signals of the fixedly positioned radio transmitters at the position, wherein the provided properties of the radio signals comprise transmitter identifications identifying the radio transmitters;

separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different, wherein the separating comprises selecting, from the second number of radio transmitters, a number of radio transmitters received too few at the position, of which there are previously recorded properties at the reference position, but of which there are no properties provided at the position, or a number of radio transmitters received in addition at the position, of which there are no previously recorded electromagnetic properties at the reference position, but of which there are electromagnetic properties provided at the position; and determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently, wherein the determining comprises associating a malus value with one of the radio transmitters not received at the position or a malus value with a radio transmitter received in addition at the position.

19. A non-transitory computer readable medium including a computer program including computer code for carrying out, when the computer program is executed on a computer, a method of determining a coincidence of a position with a reference position, wherein radio signals from fixedly positioned radio transmitters can be received at the position, comprising:

providing properties of the radio signals of the fixedly positioned radio transmitters at the position, wherein the provided properties of the radio signals comprise transmitter identifications identifying the radio transmitters;

separating the radio transmitters into a first number of radio transmitters previously recorded transmitter identifications of which at the reference position are identical with transmitter identifications provided at the position, and into a second number of radio transmitters previously recorded transmitter identifications of which at the reference position and transmitter identifications provided at the position are different, wherein the separating comprises selecting, from the second number of radio transmitters, a number of radio transmitters received too few at the position, of which there are previously recorded properties at the reference position, but of which there are no properties provided at the position, or a number of radio transmitters received in addition at the position, of which there are no previously recorded electromagnetic properties at the reference position, but of which there are electromagnetic properties provided at the position; and determining a measure of matching for the position on the basis of the provided properties of the radio signals, wherein both properties of the first number of radio transmitters and properties of the second number of radio transmitters are taken into account in the determination of a measure of matching, and wherein the properties of the first number of radio transmitters and the properties of the second number of radio transmitters enter the measure of matching differently, wherein the determining comprises associating a malus value with one of the radio transmitters not received at the position or a malus value with a radio transmitter received in addition at the position.

20. An apparatus for determining coincidence of a current position with a reference position based on radio signals received at the current position from fixedly positioned radio transmitters, said apparatus comprising:

a determiner for determining properties of the radio signals of the fixedly positioned radio transmitters at the current position, the determined properties of the radio signals including transmitter identifications identifying the radio transmitters;

a separator for separating the fixedly positioned radio transmitters into a first number of radio transmitters and a second number of radio transmitters, the first number of radio transmitters comprising the fixedly positioned radio transmitters having previously recorded transmitter identifications at the reference position which are identical with transmitter identifications determined at the current position, and the second number of radio transmitters comprising the fixedly positioned radio transmitters having previously recorded transmitter identifications at the reference position which are different from the transmitter identifications determined at the current position, the separator for separating being configured to select, from the second number of radio transmitters, a number of radio transmitters having: (i) previously recorded properties at the reference position and no properties determined at the current position; or (ii) no previously recorded properties at the reference position and having properties determined at the current position; and a determiner for determining a measure of matching for the current position on the basis of the determined properties of the radio signals, the determination of the measure of matching being based on properties of the first number of radio transmitters and properties of the second number of radio transmitters, the properties of the first number of radio transmitters and the properties of the second number of radio transmitters being weighted differently, wherein the determiner for determining a measure of matching is configured to associate a malus value with (i) one of the fixedly positioned radio transmitters not received at the current position; or (ii) a radio transmitter received at the current position having no previously recorded properties at the reference position and having properties determined at the current position.

* * * * *